United States Patent

Debono

[15] 3,687,947
[45] Aug. 29, 1972

[54] METHOD FOR RECOVERY OF CEPHALORIDINE

[72] Inventor: Manuel Debono, Indianapolis, Ind. 46208

[73] Assignee: Eli Lilly and Company, Indianapolis, Ind.

[22] Filed: Oct. 29, 1970

[21] Appl. No.: 85,264

[52] U.S. Cl. ............................................260/243 C
[51] Int. Cl. ...........................................C07d 99/24
[58] Field of Search ................................260/243 C

[56] References Cited

UNITED STATES PATENTS 3,520,884  7/1970  Sharp et al. ............260/243 C

Primary Examiner—Nicholas S. Rizzo
Attorney—Everet F. Smith and John T. Reynolds

[57] ABSTRACT

This invention is addressed to a new and improved process for the recovery of 7-(2'-thienylacetamido)-3-pyridino-methyl)-$\Delta^3$-cephem-4-carboxylic acid (i.e., cephaloridine) from an aqueous reaction mixture in which cephalothin is reacted with pyridine in an aqueous solution in the presence of thiocyanate which includes the step of adding a source of barium ions to the reaction mixture to precipitate colored impurities contained therein, followed by separating the precipitate to leave substantially pure cephaloridine in the aqueous solution.

13 Claims, No Drawings

METHOD FOR RECOVERY OF CEPHALORIDINE

This invention relates to a new and improved method for the recovery of cephalosporin antibiotics, and more particularly to a new and improved method for the recovery of cephaloridine.

In U. S. Pat. Nos. 3,218,318, 3,270,012, and 3,449,338, description is made of 7-acylamido-3-pyridinomethyl-$\Delta^3$-cephem-4-carboxylic acids, a potent class of antibiotics having the basic ring structure of cephalosporin C. Among the preferred compounds described in the aforementioned patents, 7-(2'-thienylacetamido)-3-pyridinomethyl-$\Delta^3$-cephem-4-carboxylic acid, now generically known as cephaloridine and having the formula

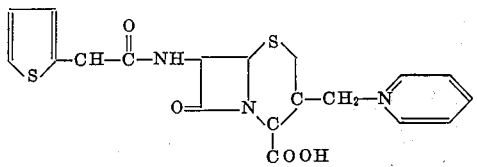

has been found to have particularly valuable properties as an antibiotic. Cephaloridine is shown here in the acid form, but it is also known that this compound exists as the betaine or zwitterionic form.

In the Higgins process patent (U.S. Pat. No. 3,270,012) description is made of an improved method for the preparation of cephaloridine wherein 7-(2'-thienylacetamido)-3-acetoxymethyl-$\Delta^3$-cephem-4-carboxylic acid, known generically as cephalothin, and preferably a water-soluble salt thereof (e.g., sodium, potassium, ammonium, lithium salts) is reacted with pyridine in aqueous medium in the presence of a thiocyanate salt. It was found in accordance with the process of Higgins that the presence of the thiocyanate served to accelerate the reaction and to stabilize the reactants and products.

While the process of Higgins as described above represents a significant advance in the preparation of cephaloridine from cephalothin, it has been found that the reaction mixture contains colored impurities which impart to the cephaloridine gummy properties, and thereby hinder the isolation of the cephaloridine.

It is accordingly an object of the present invention to provide a new and improved process for the recovery of cephaloridine from a reaction mixture formed by the reaction of cephalothin with pyridine in which undesirable impurities are easily separated from the reaction mixture.

It is a related object of the invention to provide a new and improved process for the preparation of cephaloridine from cephalothin and pyridine in which cephaloridine is separated in increased yields and purity.

The concepts of the present invention reside in an improved process for the recovery of cephaloridine from a reaction mixture formed by reaction of cephalothin with pyridine in aqueous media in the presence of a thiocyanate salt in which a water-soluble salt of barium is added to the reaction mixture to precipitate the colored impurities. Thus, the precipitate thus formed can be easily removed as by, for example, filtration, centrifugation, etc., and cephaloridine recovered in the form of an acid addition salt. The acid salt thus produced does not have the gummy characteristics common to the acid salt produced when no barium is employed.

In accordance with the practice of this invention, the cephaloridine reaction mixture is prepared from cephalothin and pyridine in accordance with the procedure described by Higgins wherein the reactants are reacted in aqueous medium in the presence of a thiocyanate at a pH within the range of 3 to 8.5, and preferably 6 to 7. The reaction temperature is not critical, and can be varied within wide limits, such as within the range of 40° to 100°C., and preferably 50° to 75°C. The pH of the reaction mixture can conveniently be controlled by the addition of an acid thereto, such as phosphoric acid, hydrochloric acid, etc.

The amount of pyridine employed should be at least a stoichiometric amount. However, it is generally advantageous to employ a stoichiometric excess of pyridine, such as an excess within the range of 10 to 100 percent, to effect maximum conversions.

As the thiocyanate, use can be made of a variety of sources of the thiocyanate ion as described by Higgins in the aforementioned patent. Representative of suitable sources of thiocyanate ions are potassium thiocyanate, pyridine thiocyanate, triethylamine thiocyanate, sodium thiocyanate, ammonium thiocyanate, lithium thiocyanate, strontium thiocyanate, etc. In general, use is preferably made of the thiocyanate in an amount of from 2 to 30 moles of thiocyanate per mole of cephalothin.

Under the reaction conditions, the acetoxy group of the cephalothin is split off and replaced by pyridine with the attachment of the pyridine to the 3-methylene group being through the nitrogen atom, forming a quaternary nitrogen derivative.

After the reaction is substantially complete, usually within 4 to 8 hours under the preferred conditions, the reaction mixture is treated in accordance with the process of this invention.

Thus, the water-soluble barium salt is added to the aqueous reaction mixture to precipitate the colored impurities which are formed during the reaction, and the resulting solids separated from the reaction mixture. It is frequently desirable to cool the reaction mixture after addition of the barium ions in order to accelerate precipitation of the solid impurities. For this purpose, it is preferred to cool the reaction mixture after addition of the barium ions to a temperature below 10°C.

As the source of barium ions, use can be made of any water-soluble barium salt. It is frequently preferred to employ barium thiocyanate to avoid the further introduction of different anions into the system. However, a number of other water-soluble barium salts may also be used in the practice of the invention, including barium iodide, barium acetate, barium bromide, barium chloride, barium nitrate as well as a number of others.

The barium salt should be used in an amount sufficient to precipitate substantially all of the colored impurities from the reaction mixture. For this purpose, use is generally made of the barium salt in a mole ratio of from 0.05 to 1.0 moles of barium salt per mole of cephalothin. As will be appreciated by those skilled in the art, excesses of the barium salt can be employed without adverse effects.

After the impurities are precipitated from the reaction mixture, the solids are removed in a conventional manner as by, for example, filtration or centrifugation. The cephaloridine can then be separated from the reaction mixture in the form of an acid salt by adding an acid to adjust the pH of the mixture whereby the acid salt precipitates from the aqueous solution. Any of a variety of acids may be used for this purpose, including hydrochloric, hydrobromic, phosphoric, sulfuric and like acids.

Cephaloridine, as indicated in U. S. Pat. No. 3,218,318, can be used in the form of its acid salts of the type described above. However, it is frequently desirable to convert the acid salt to the inner or zwitterionic salt. To this end, it is convenient to use the procedure described by Flynn in U.S. Pat. No. 3,449,338. Thus, an aqueous solution of the acid salt is contacted with an organic amine anion exchange resin in the form of its salt with a weak organic acid, such as acetic acid, propionic acid, citric acid, tartaric acid and the like. Suitable anion exchange resins are commercially available from the Rohm and Haas Co. under the designation of Amberlite LA–1 or LA–2.

The anion exchange resins are preferably employed in the form of solution containing about 5–35 percent by weight of the resin in a liquid carrier which is a non-solvent for the cephaloridine product. The preferred carrier is methyl isobutyl ketone which is a solvent for the resin and the acid salt of cephaloridine, but not for cephaloridine itself.

After treatment of the acid salt of cephaloridine with the resin, the cephaloridine product frequently precipitates from the solution, although it is frequently advantageous to concentrate, cool and seed the solution to facilitate recovery of the product.

Having described the basic concepts of the invention, reference is now made to the following examples which are provided by way of illustration, but not of limitation, of the practice of the invention.

EXAMPLE 1

A solution of 10 g. (24 m.M.) of cephalothin, 45.4 g. (4.75 m.M.) of potassium thiocyanate, 2.5 ml. (37.5 m.M.) of pyridine and 0.4 ml. of 85 percent phosphoric acid in 10 ml. of water is heated to a temperature of about 60°C. for 5 hours with stirring. At this point, the reaction mixture has a reddish-black color, and is cooled to room temperature and diluted with 40 ml. of water. Thereafter, a total of 1.0 g. (3.4 m.M.) of barium thiocyanate crystals is added to the reaction mixture in three equal portions over a period of about 5 minutes. The resulting mixture is then stirred for 15 minutes at room temperature, and then cooled to 0°C. for 1 hour.

The dense dark brown precipitate is then removed from the aqueous solution, washed and dried at 0°C. for 4 hours. The total amount of the dark brown precipitate is 0.46 g.

The filtrate remaining after filtration of the colored impurities containing the cephaloridine is then acidified with 6 N solution of HCl to adjust the pH of the aqueous solution to 1.2. Thereafter, the acidified solution is cooled to 0°C. for 3 hours, and 10.2 g. of the acid salt is separated from the aqueous solution by filtration. The yield of the acid salt is 89 percent.

Thereafter, the acid salt thus obtained is dissolved in water and contacted with a liquid ion-exchange resin in the form of the salt of acetic acid with an organic amine anion exchange resin (Amberlite LA–1) to convert the acid salt to the corresponding inner salt. There is collected 6.75 g. of cephaloridine after treatment with the anion exchange resin.

EXAMPLE 2

Using the procedure described in Example 1, a reaction mixture produced by reaction of cephalothin with pyridine in the presence of sodium thiocyanate, is diluted with 50 ml. of water, and barium acetate (2.0 g.) is added.

The resulting mixture is then stirred, and cooled to about 5°C. for 1 hours. A dense dark precipitate is formed, and separated from the aqueous solution by filtration. Thereafter, the filtrate containing the cephaloridine is acidified with an HCl solution to adjust the pH to about 2.0. After cooling to a temperature of about 0°C. for 2 hours, the cephaloridine is precipitated from the aqueous solution, and recovered by filtration in the form of its hydrogen chloride addition salt.

EXAMPLE 3

The procedure described in Example 1 is repeated except that use is made of about 1.5 g. of barium iodide. After addition of the barium iodide, the resulting solution is stirred for 20 minutes at room temperature and then cooled to precipitate the dark impurities. The impurities are then separated from the aqueous solution by filtration, and the cephaloridine is recovered from the aqueous solution in the form of its acid addition salt, which is then dissolved in water and treated with an anion exchange resin (Amberlite LA–1) to convert the acid salt to the corresponding inner salt.

EXAMPLE 4

The procedure described above in Example 1 is repeated except that barium nitrate is employed to precipitate the colored impurities from the reaction mixture. Again, good results are obtained, and cephaloridine is recovered in the manner described in Example 1 in a yield of about 55percent. The cephaloridine recovered does not have the gummy characteristics of cephaloridine prepared in the same manner except without the addition of a barium salt.

EXAMPLE 5

The procedure of Example 1 is again repeated using barium bromide for the water-soluble barium salt. Comparable results are obtained.

It will be understood that various changes and modifications can be made in the details of procedure and use without departing from the spirit of the invention, especially as defined in the following claims.

I claim:

1. A process for the recovery of 7-(2'-thienylacetamido)-3-pyridinomethyl-$\Delta^3$-cephem-4-carboxylic acid from an aqueous reaction mixture in which 7-(2'-thienylacetamido)-3-acetoxymethyl-$\Delta^3$-cephem-4-carboxylic acid is reacted with pyridine in aqueous solution in the presence of a thiocyanate comprising the steps of adding a water-soluble barium salt to the aqueous reaction mixture to precipitate the colored impurities, separating the precipitate thus formed and then separating the 7-(2'-thienylacetamido)-3-pyridinomethyl-$\Delta^3$-cephem-4-carboxylic acid from the aqueous reaction mixture.

2. A process as defined in claim 1 which includes the step of cooling the reaction mixture after addition of the barium salt to accelerate precipitation of the colored impurities.

3. A process as defined in claim 2 wherein the reaction mixture is cooled to a temperature below 10°C.

4. A process as defined in claim 1 wherein the barium salt is added in an amount within the range of 0.05 to 1.0 moles of barium ions per mole of 7-(2'-thienylacetamide)-3-acetoxy-methyl-$\Delta^3$-cephem-4-carboxylic acid reacted.

5. A process as defined in claim 1 wherein the barium salt is barium thiocyanate.

6. A process as defied in claim 1 wherein the 7-(2'-thienylacetamido)-3-pyridinomethyl-$\Delta^3$-cephem-4-carboxylic acid separated from the aqueous reaction mixture in the form of an acid salt by adding an acid to the aqueous solution to precipitate the acid salt.

7. A process as defined in claim 1 wherein the 7-(2'-thienylacetamido)-3-pyridinomethyl-$\Delta^3$-cephem-4-carboxylic acid is separated as the inner salt by adding an acid to the aqueous reaction mixture to form the corresponding acid salt, treating the acid salt with the salt formed of a weak organic acid and an organic amine anion exchange resin to form the inner salt and separating the inner salt thus formed.

8. A process as defined in claim 7 wherein the salt formed of a weak organic acid and the resin is used in solution in a liquid carrier which is a non-solvent for the inner salt.

9. In the process for the preparation of 7-(2'-thienylacetamido)-3-pyridinomethyl-$\Delta^3$-cephem-4-carboxylic acid by reaction of 7-(2'-thienylacetamido-3-acetoxymethyl-$\Delta^3$-cephem-4-carboxylic acid and pyridine in aqueous medium in the presence of a thiocyanate, the improvement comprising adding a water-soluble barium salt to the aqueous reaction mixture to precipitate the colored impurities, separating the precipitate thus formed and separating the 7-(2'-thienylacetamido)-3-pyridinomethyl-$\Delta^3$-cephem-4-carboxylic acid from the aqueous reaction mixture.

10. A process as defined in claim 9 which includes the step of cooling the reaction mixture after addition of the barium ions to accelerate precipitation of the colored impurities.

11. A process as defined in claim 10 wherein the reaction mixture is cooled to a temperature below 10°C.

12. A process as defined in claim 10 wherein the barium salt is added in an amount within the range of 0.05 to 1.0 moles of barium ions per mole of 7-(2'-thienylacetamido)-3-acetoxymethyl-$\Delta^3$-cephem-4-carboxylic acid reacted.

13. A process as defined in claim 10 wherein the barium salt is barium thiocyanate.

* * * * *